(12) United States Patent
Bajko et al.

(10) Patent No.: US 11,540,168 B2
(45) Date of Patent: Dec. 27, 2022

(54) APPARATUS AND METHODS OF PACKET RETRANSMISSION BETWEEN MULTI-LINK DEVICES

(71) Applicant: MediaTek Singapore Pte. Ltd., Singapore (SG)

(72) Inventors: Gabor Bajko, San Jose, CA (US); Yongho Seok, San Jose, CA (US); James Chih-Shi Yee, San Jose, CA (US); Kai Ying Lu, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/941,357

(22) Filed: Jul. 28, 2020

(65) Prior Publication Data

US 2021/0045008 A1 Feb. 11, 2021

Related U.S. Application Data (60) Provisional application No. 62/882,630, filed on Aug. 5, 2019.

(51) Int. Cl.
| | |
|---|---|
| H04W 28/04 | (2009.01) |
| H04W 76/15 | (2018.01) |
| H04L 29/12 | (2006.01) |
| H04W 12/06 | (2021.01) |
| H04W 12/037 | (2021.01) |
| H04B 1/00 | (2006.01) |
| H04W 80/02 | (2009.01) |
| H04W 84/12 | (2009.01) |

(Continued)

(52) U.S. Cl.
CPC ......... *H04W 28/04* (2013.01); *H04W 12/037* (2021.01); *H04W 12/06* (2013.01); *H04W 76/15* (2018.02); *H04B 1/0064* (2013.01); *H04B 1/52* (2013.01); *H04L 2101/622* (2022.05); *H04W 80/02* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2008/0273700 A1* | 11/2008 | Wentink | .............. | H04W 12/033 380/270 |
| 2016/0337783 A1* | 11/2016 | Seok | .................. | H04L 63/0428 |

(Continued)

*Primary Examiner* — Diane L Lo (57) ABSTRACT

Embodiments of the present invention provide apparatus and methods for multi-link operations that include retransmission of data using different wireless links. The following discussion describes one such exemplary electronic system or computer system that can be used as a platform for implementing embodiments of the present invention. The multi-link device can be a multi-link wireless access point or a multi-link wireless station, for example. The multi-link device can operate multiple transceivers simultaneously to perform multi-link operations including retransmission using different wireless links. For example, the multi-link device can transmit an encrypted MPDU using a first wireless link, and retransmit the MPDU using a second wireless link by setting a MAC header of the MPDU according to a MAC address of the second wireless link, to advantageously enhance the performance, reliability, and efficiency of the wireless network.

20 Claims, 9 Drawing Sheets

(51) Int. Cl.
*H04B 1/52* (2015.01)
*H04L 101/622* (2022.01)

(56) References Cited

U.S. PATENT DOCUMENTS

2018/0206174 A1* 7/2018 Zhou .................... H04L 45/245
2020/0374802 A1* 11/2020 Chu .................... H04W 40/244

* cited by examiner

APPARATUS AND METHODS OF PACKET RETRANSMISSION BETWEEN MULTI-LINK DEVICES

CROSS-REFERENCE TO RELATED APPLICATIONS

This application claims the benefit of and priority to provisional patent application Ser. No. 62/882,630, with filing date Aug. 5, 2019, by Gabor Bajko et al., which is hereby incorporated by reference in its entirety.

FIELD

Embodiments of the present invention generally relate to the field of wireless communications. More specifically, embodiments of the present invention relate to systems and methods for retransmission of data within a wireless communication network.

BACKGROUND

Modern electronic devices typically send and receive data with other electronic devices wirelessly using Wi-Fi based technology that includes a wireless access point (AP) servicing one or more wireless stations (STAs) in a basic service set (BSS). However, it may be advantageous in some circumstances for a wireless STA to connect to a different wireless link, for example, that is subject to less interference than the wireless link that the wireless STA is currently connected to, or that is currently being used by a peer wireless device after an unscheduled channel switch.

Unfortunately, exiting approaches to data retransmission in a wireless network can typically only operate using a single wireless link. For example, when a data transmission (e.g., an MPDU) is encoded for transmission on a first link and not delivered successfully (possibly after a number of attempts), existing approaches to data retransmission are unable to send a subsequent retransmission over a different link because the MPDU has already been encoded for the wireless link that was originally used for transmission. Specifically, the encrypted MPDU includes a MAC header that is set using a MAC address for the first wireless link.

SUMMARY

Multi-link operations can provide higher network throughput and improved network reliability compared to traditional techniques for wireless communication. Accordingly, what is needed is an approach to wireless data retransmission that can advantageously transmit data over multiple wireless links using a multi-link operation to improve the efficiency and performance of the wireless network while overcoming the limitations of existing approaches to data retransmission including those described above.

Embodiments of the present invention provide apparatus and methods for multi-link operations that include retransmission of data using different wireless links. The multi-link device can be a multi-link wireless access point or a multi-link wireless station, for example. The multi-link device can operate multiple transceivers simultaneously to perform multi-link operations including retransmission using different wireless links. For example, the multi-link device can transmit an encrypted MPDU using a first wireless link, and retransmit the MPDU using a second wireless link by setting a MAC header of the MPDU according to a MAC address of the second wireless link, to advantageously enhance the performance, reliability, and efficiency of the wireless network.

According to one embodiment, a method of data retransmission over multiple wireless links using a multi-link device is disclosed. The method includes transmitting an encrypted MPDU including an authenticated data portion over a first wireless link of the multi-link device, including a MAC header corresponding to the first wireless link in the authenticated data portion, and determining that the encrypted MPDU requires retransmission over a second wireless link of the multi-link device using the MAC header.

According to some embodiments, the method includes storing a plaintext MPDU of the encrypted MPDU.

According to some embodiments, the method includes re-encrypting the stored plaintext MPDU using the MAC header corresponding to the second wireless link of the MPDU in the authenticated data portion of the encrypted MPDU.

According to some embodiments, the method includes retransmitting a re-encrypted MPDU over the second wireless link.

According to some embodiments, the method includes negotiating a link setup procedure with a peer wireless device.

According to some embodiments, negotiating a link setup procedure with a peer wireless device includes negotiating a MAC address selection, the MAC address selection includes at least one of a MAC-SAP address, a WM MAC address, and a virtual address.

According to some embodiments, the method includes determining a method of retransmission of an MPDU on the second wireless link.

According to some embodiments, determining that an encrypted MPDU requires retransmission includes determining that a wireless link between peer devices is not available for MPDU transmission, and a different wireless link between peer devices is available for MPDU transmission.

According to some embodiments, determining that an encrypted MPDU requires retransmission includes determining that the multi-link device is transmitting delay sensitive data over the first wireless link and the second wireless link.

According to some embodiments, re-encrypting the plaintext MPDU for transmission over the second wireless link of the multi-link device includes sending a request from an upper layer of the multi-link device to a lower layer of the multi-link device to re-encrypt the MPDU.

According to some embodiments, the upper layer includes an application layer.

According to some embodiments, the lower layer includes a MAC layer.

According to a different embodiment, a method of data retransmission over multiple wireless links using a multi-link device is disclosed. The method includes transmitting an encrypted MPDU over a first wireless link of the multi-link device, modifying a MAC header of the encrypted MPDU to indicate that the encrypted MPDU is encrypted using MAC addresses of the first wireless link, and retransmitting the encrypted MPDU over the second wireless link with a modified MAC header.

According to some embodiments, the method includes negotiating a link setup procedure with a peer wireless device.

According to some embodiments, the method includes determining that the multi-link device is transmitting delay sensitive data over the first wireless link and the second wireless link.

According to another embodiment, a multi-link device for performing data retransmission using multiple wireless links. The device includes a first transceiver configured to send and receive data over a first wireless link of the multi-link device, a second transceiver configured to send and receive data over a second wireless link of the multi-link device, a memory for storing MPDUs, and a processor operable to cause the transceivers to transmit an encrypted MPDU including an authenticated data portion over a first wireless link of the multi-link device, to include a MAC header corresponding to the first wireless link in the authenticated data portion, and to determine that the encrypted MPDU requires retransmission over a second wireless link of the multi-link device using the MAC header.

According to some embodiments, the processor is further operable to store the encrypted MPDU as a plaintext MPDU in the memory.

According to some embodiments, the processor is further operable to retransmit a re-encrypted MPDU over the second wireless link.

According to some embodiments, the processor is further operable to negotiate a link setup procedure with a peer wireless device.

According to some embodiments, negotiating a link setup procedure with a peer wireless device includes negotiating a MAC address selection, the MAC address selection includes at least one of: a MAC-SAP address, a WM MAC address, and a virtual address.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 6-8) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "coordinating," "storing," "transmitting," "retransmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Novel Packet Retransmission Process Between Multi-Link Devices

As used herein, the term "EHT" may refer generally to a recent generation of wireless communication (Wi-Fi) known as Extremely High Throughput (EHT) and is defined according to the IEEE 802.11be standards. The term station (STA) refers generally to an electronic device capable of sending and receiving data over Wi-Fi that is not operating as an access point (AP).

Embodiments of the present invention provide apparatus and methods for multi-link operations that include retransmission of data using different wireless links. The multi-link device can be a multi-link wireless access point or a multi-link wireless station, for example. The multi-link device can operate multiple transceivers simultaneously to perform multi-link operations including retransmission using different wireless links. For example, the multi-link device can transmit an encrypted MPDU using a first wireless link, and retransmit the MPDU using a second wireless link by setting a MAC header of the MPDU according to a MAC address of the second wireless link, to advantageously enhance the performance, reliability, and efficiency of the wireless network.

Multi-link operations can provide higher network throughput and improved network flexibility compared to traditional techniques for wireless communication. With regard to FIG. 1, an exemplary wireless communication system 100 including a multi-band cooperative AP 105 and a multi-band cooperative STA 155 are depicted according to embodiments of the present invention. The multi-band cooperative AP 105 includes a 5 GHz transceiver 110 and a 2.4 GHz transceiver 115. Other types of transceivers that operate on different bands, such as 6 GHz and above, can also be used by the multi-band cooperative AP 105 according to embodiments of the present invention. The transceivers 110 and 115 of AP 105 exchange data and information with cooperative management unit 120 that coordinates information sent and/or received by transceivers 110 and 115.

Figure 1:
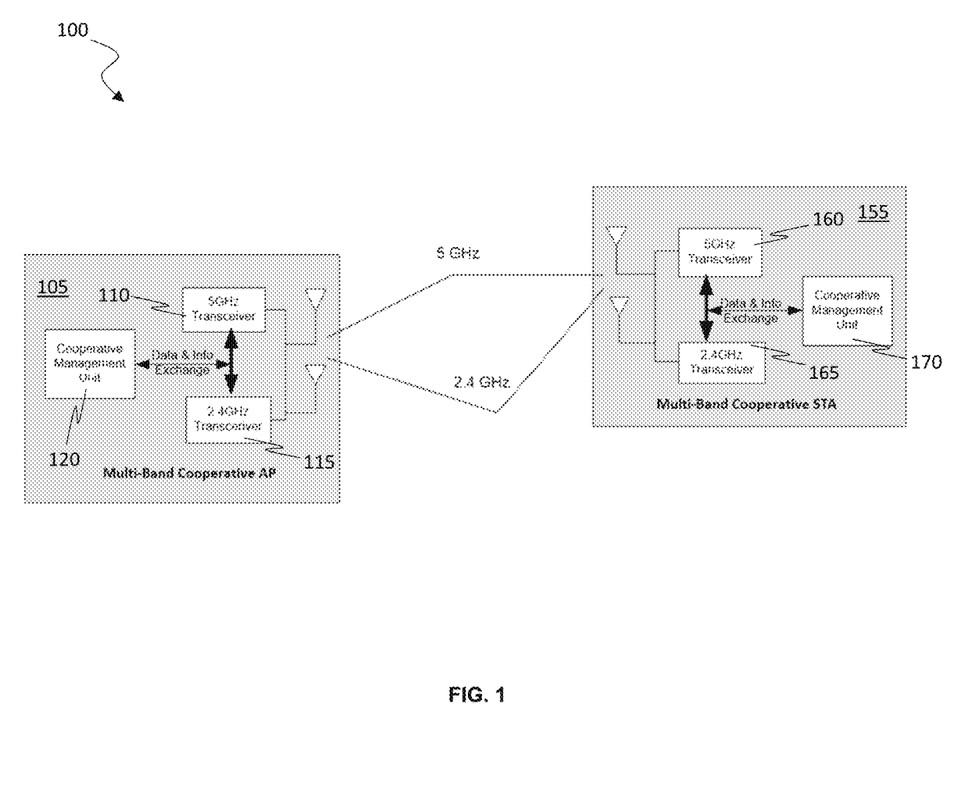
FIG. 1 is a block diagram of an exemplary wireless communication system including a multi-band cooperative AP and a multi-band cooperative STA according to embodiments of the present invention.

The multi-band cooperative STA 155 includes a 5 GHz transceiver 160 and a 2.4 GHz transceiver 165. Other types of transceivers that operate on different bands, such as 6 GHz and above, can also be used by the multi-band cooperative STA 155 according to some embodiments of the present invention. The transceivers 160 and 165 of STA 155 exchange data and information with cooperative management unit 170 that coordinates information sent and received by transceivers 160 and 165 using 5 GHz band wireless communication and 2.4 GHz band wireless communication, respectively.

The multi-band cooperative AP 105 and the multi-band cooperative STA 155 have simultaneous transmission and reception capabilities for communicating using different wireless bands. The transmitters operating on the different bands can perform independent clear channel assessments (CCAs) using joint or intendent transmissions. Moreover, full duplex communication can be enabled by independent multi-band operation using FDD mode.

STA 155 transmitting frames using multiple bands simultaneously can mitigate delay and improve peak throughput of STA 155. However, in some cases, transmitting frames using multiple bands simultaneously can degrade the performance of the basic service set (BSS) comprising STA 155. For example, the performance of the BSS can be degraded when STA 155 operating on multiple bands simultaneously uses a substantial amount of the bandwidth available to the BSS due to the increased traffic. Therefore, the AP 105 can control which STAs are granted multi-band channel access, and the access can be terminated by the AP at any time, for example, based on changing network conditions or requirements.

Depending on certain conditions, such as traffic load, a non-AP STA may use fewer than all supported/available links in order to reduce energy consumption. Moreover, a non-AP STA may apply an independent power management for each link, and the AP can provide the TID-to-link mapping information for each link. Depending the Quality of Service (QoS) policy of the Basic Service Set (BSS), an AP may allocate the traffic to different links based on traffic type, such as voice, video, data, etc. For example, frames belonging to a first Traffic Identifier (TID 1) can be allocated to a first link, and frames belonging to a second Traffic Identifier (TID 2) can be allocated to a second link. In this case, the AP may provide the TID-to-link mapping information for both links to the STA, where some data can only be sent on the first link, and other data can only be sent on the second link.

Data transmitted over a first wireless link, such as the 5 GHz wireless link provided by 5 GHz transceiver 110 or 160, can be retransmitted over a different wireless link. For example, if a data transmission over the 5 GHz wireless link is sent unsuccessfully (e.g., no acknowledgment received), the data can be retransmitted over the 2.4 GHz wireless link provided by 2.4 GHz transceiver 115/165. The data can be retransmitted over the second link when an unscheduled channel switch to another channel occurs, or when transmitted a delay-sensitive packet over multiple links. Moreover, the data transmission (e.g., a PPDU) can be originally encoded for transmission on a first wireless link (e.g., a 2.4 GHz or 5 GHz wireless link), and the retransmitted data can be prepared for transmission according to embodiments of the present invention described herein for encrypting data for retransmission in a multi-link environment.

Figure 2:
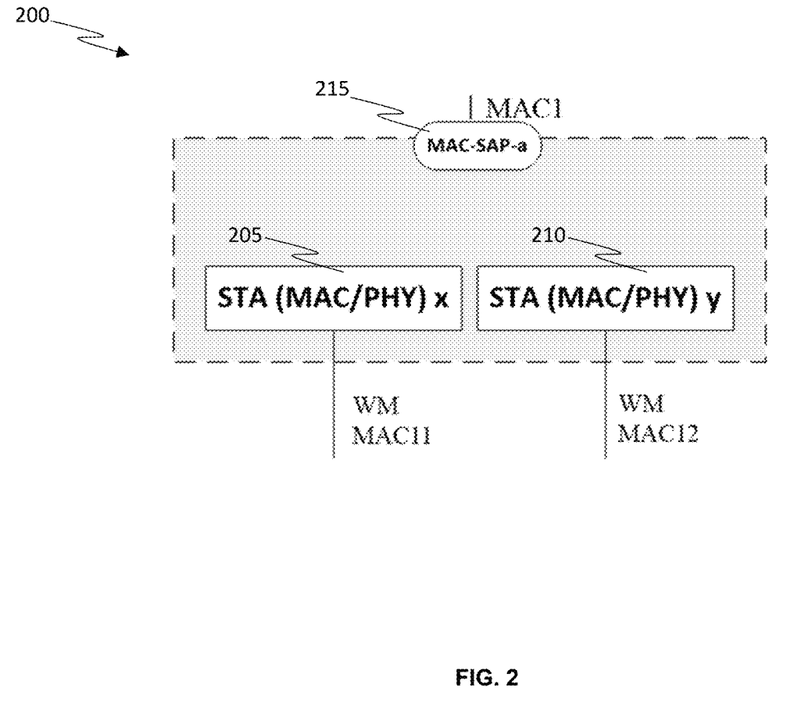
FIG. 2 is a block diagram of an exemplary wireless STA including two STA instances according to embodiments of the present invention.

FIG. 2 is a block diagram depicting an exemplary wireless STA 200 including STA instance 205 and STA instance 210 according to embodiments of the present invention. STA instance 205 is configured to communicate data over wireless link 11, and STA instance 210 is configured to communicate data over wireless link 12. During a multi-link operation, wireless STA 200 is viewed as a single device. The STA instances 205 and 210 use the wireless medium (WM) media access control (MAC) address to identify themselves to peer devices. Wireless STA 200 also includes a MAC services address point (SAP) 215 which is an interface that receives a plaintext MPDU for transmission over wireless link 11 or wireless link 12. Each wireless link of wireless SAT 200 is associated with a different MAC layer address. The address of MAC SAP 215 can be used for key generation, SA setup, and encryption of data for retransmission to retransmit an encrypted MPDU over a wireless link. The MAC SAP 215 can also be a DS/WAN address or a virtual address, according to embodiments of the present invention.

Figure 3:
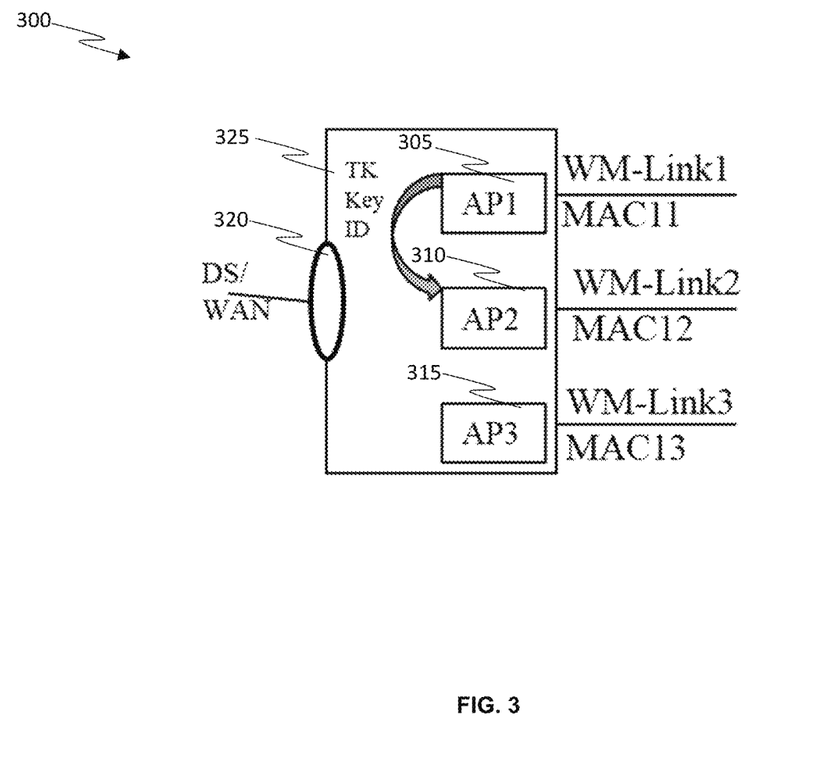
FIG. 3 is a block diagram of an exemplary wireless AP including three AP instances according to embodiments of the present invention.

FIG. 3 is a block diagram depicting an exemplary wireless AP 300 including AP instance 305, AP instance 310, and AP instance 315 according to embodiments of the present invention. AP instance 305 is configured to communicate data over wireless link 11, AP instance 310 is configured to communicate data over wireless link 12, and AP instance 315 is configured to communicate data over wireless link 13. During a multi-link operation, wireless AP 300 is viewed as a single device. Wireless AP 300 also includes a DS/WAN interface 320 that receives unencrypted (plain) data (e.g., an MPDU) for transmission over wireless link 11, wireless link 12, or wireless link 13. Each wireless link of wireless AP 300 is associated with a different MAC layer address. As depicted in FIG. 3, the address of DS/WAN interface 320 can be provided to an AP instance for key generation (e.g., TK Key ID 325), used to encrypt data for retransmission.

Figure 4:
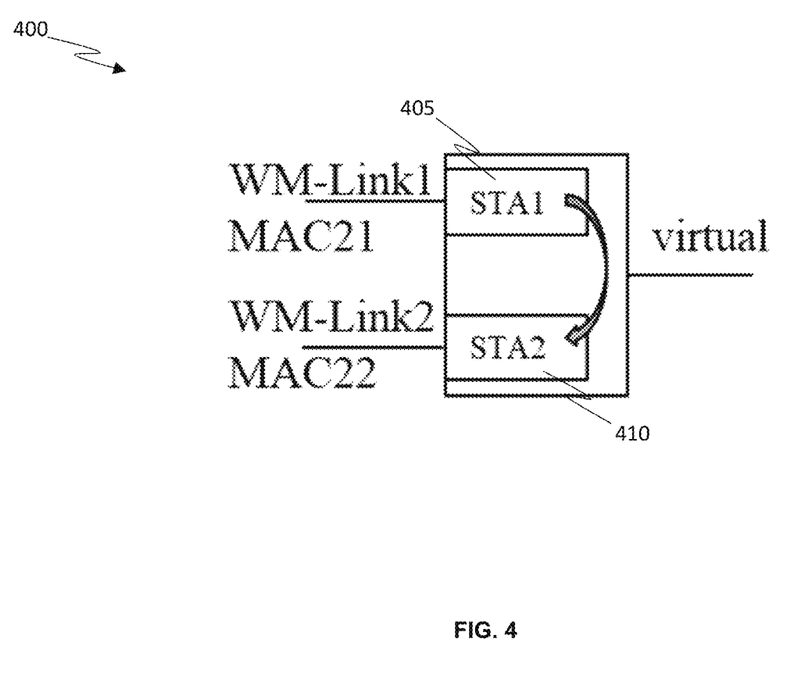
FIG. 4 is a block diagram of an exemplary wireless STA including two STA instances and a virtual interface for communicating data over multiple WM links according to embodiments of the present invention.

FIG. 4 is a block diagram depicting an exemplary wireless STA 400 including STA instance 405 and STA instance 410. STA instance 405 is configured to communicate data over WM link 1, and STA instance 210 is configured to communicate data over WM link 2 according to embodiments of the present invention. During a multi-link operation, wireless STA 400 is viewed as a single device. The STA instances 405 and 410 use the wireless medium (WM) media access control (MAC) address to identify themselves to peer devices. Wireless STA 200 also includes a virtual interface 415 that receives unencrypted (plain) data (e.g., an MPDU having an authenticated data portion) for transmission over WM link 1 or wireless WM link 2. Each WM link of wireless SAT 400 is associated with a different MAC layer address. As depicted in FIG. 4, one STA instance can provide a virtual address to another STA instance for key generation, used to encrypt authenticated data for retransmission.

Figure 5:
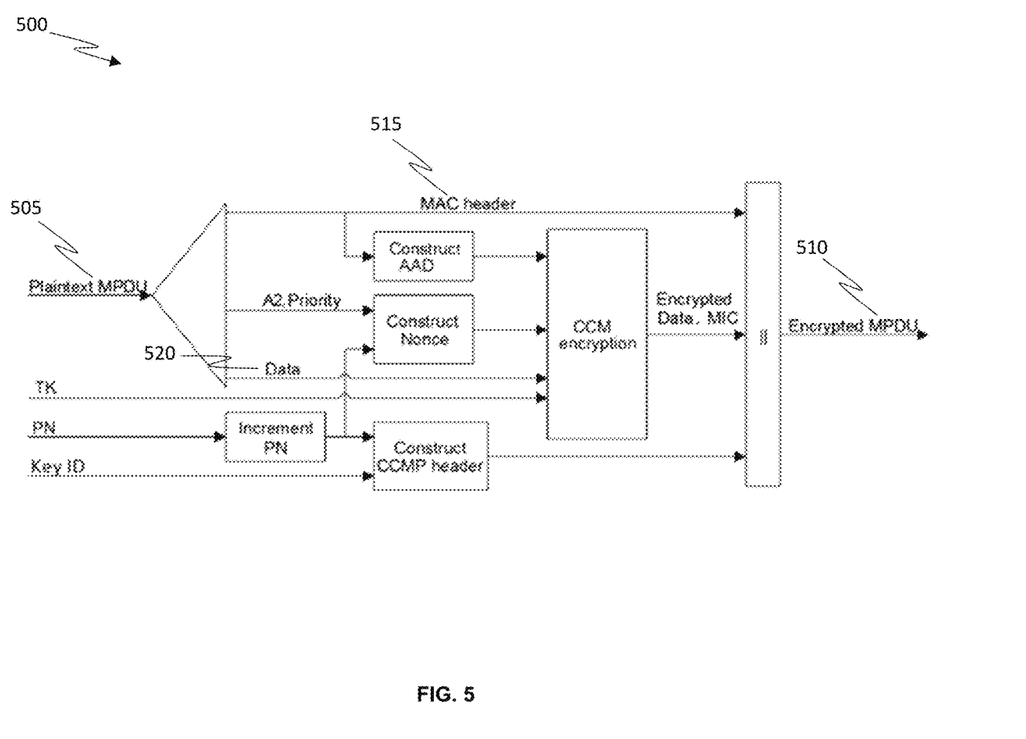
FIG. 5 is a block diagram of an exemplary CCMP encapsulation process for retransmitting a payload of an MPDU over a wireless link by a multi-link device according to embodiments of the present invention.

FIG. 5 is a block diagram of an exemplary Counter Mode Cipher Block Chaining Message Authentication Code Protocol (CCMP) encapsulation process 500 for retransmitting a payload of an MPDU over a wireless link by a multi-link device according to embodiments of the present invention. The payload (e.g., data 520) of MPDU 505 is encrypted to generate encrypted MPDU 510 for retransmission including MAC header 515 set according to a MAC address of a first wireless link of the multi-link device. MPDU 505 can be stored as plaintext or encrypted. MPDU 505 can be retransmitted subsequent to a prior transmission of the payload over a second wireless link of the multi-link device. Exemplary retransmission processes are described below with reference to FIGS. 6-8. According to some embodiments, peer devices negotiate which MAC address to use for encryption (e.g., a MAC-SAP address, a WN MAC address, or a virtual address). For example, the WM MAC address can be used for an interface that communicates with the distribution system (DS), and the virtual address can be used when the multi-link device not connected to the DS.

Figure 6:
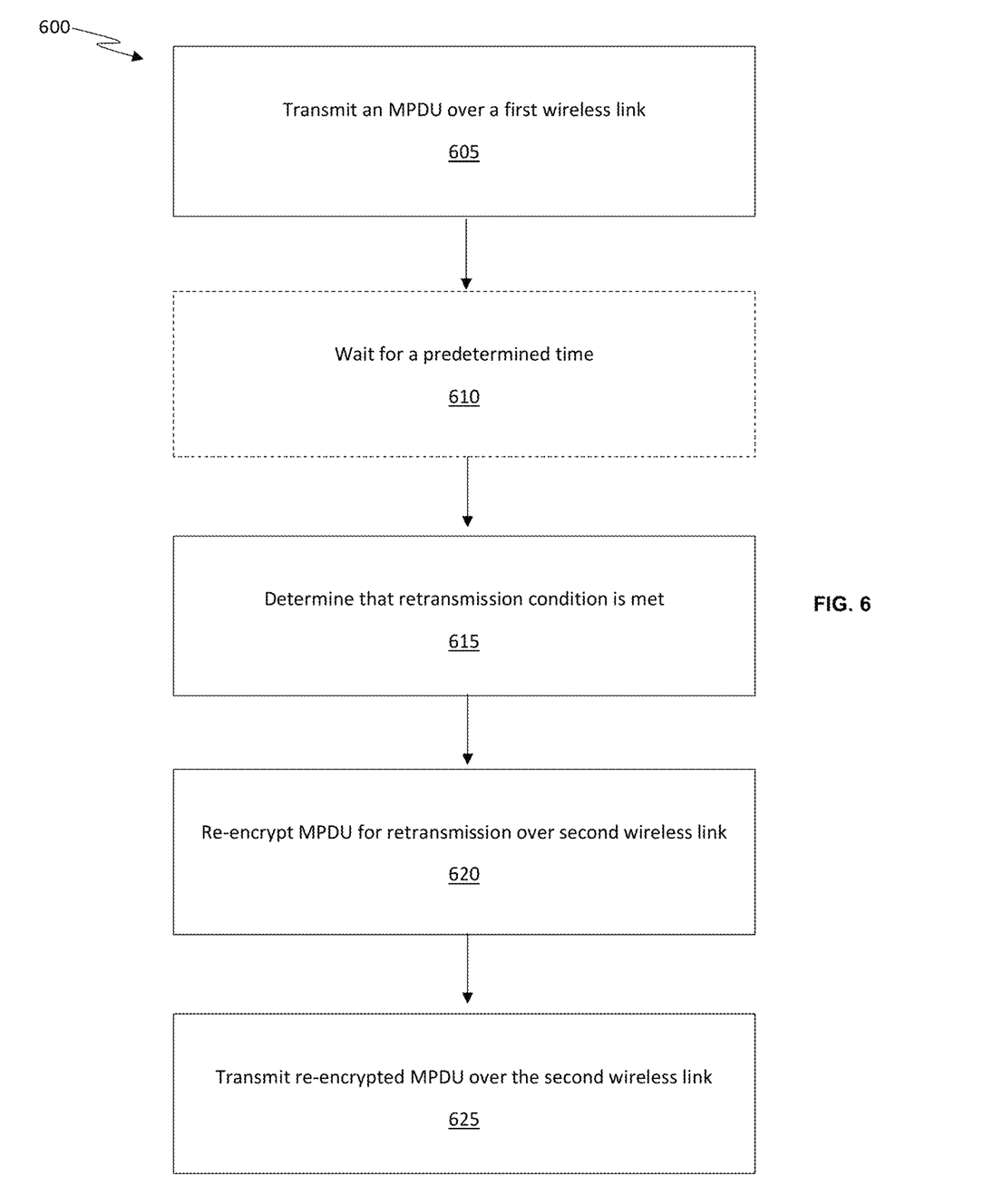
FIG. 6 a flowchart of an exemplary sequence of computer implemented steps of a process for automatically retransmitting data in a multi-link operation when an original transmission is acknowledged is depicted according to embodiments of the present invention.

With regard to FIG. 6, a flowchart of exemplary sequence of computer implemented steps of a process 600 for automatically retransmitting an authenticated data portion in a multi-link operation when an original transmission is acknowledged is depicted according to embodiments of the present invention.

At step 605 an MPDU is transmitted by a multi-link device over a first wireless link (e.g., a 2.4 GHz, 5 GHz, or 6 GHz link). The MPDU can be stored in plaintext by the multi-link device. Step 605 can include encrypting the MPDU for transmission over the first wireless link.

At step 610, the multi-link device optionally waits for a predetermined time.

At step 615, the multi-link device optionally determines that a multi-link retransmission condition has been met. The multi-link retransmission condition can include determining that the multi-link device is transmitting delay sensitive data over the first wireless link and a second wireless link (e.g., a 2.4 GHz, 5 GHz, or 6 GHz link), an ACK that indicates that authenticated data portion of the transmitted MPDU was not received and needs to be retransmitted, and determining that a peer wireless device (e.g., a peer multi-link device, a multi-link AP, a multi-link STA, etc.) has switched from the first wireless link to the second wireless link.

At step 620, the plain MPDU is re-encrypted for retransmission over a second wireless link by the multi-link device. The MPDU can be re-encrypted using the CCMP encapsulation process depicted in FIG. 5. For example, the MPDU can be stored by the wireless device in plaintext, and the MAC header included in the MPDU can be set according to the address of the second wireless link for retransmission with the MPDU after it is re-encrypted.

At step 625, the re-encrypted MPDU is transmitted using the second wireless link in a multi-link operation.

Figure 7:
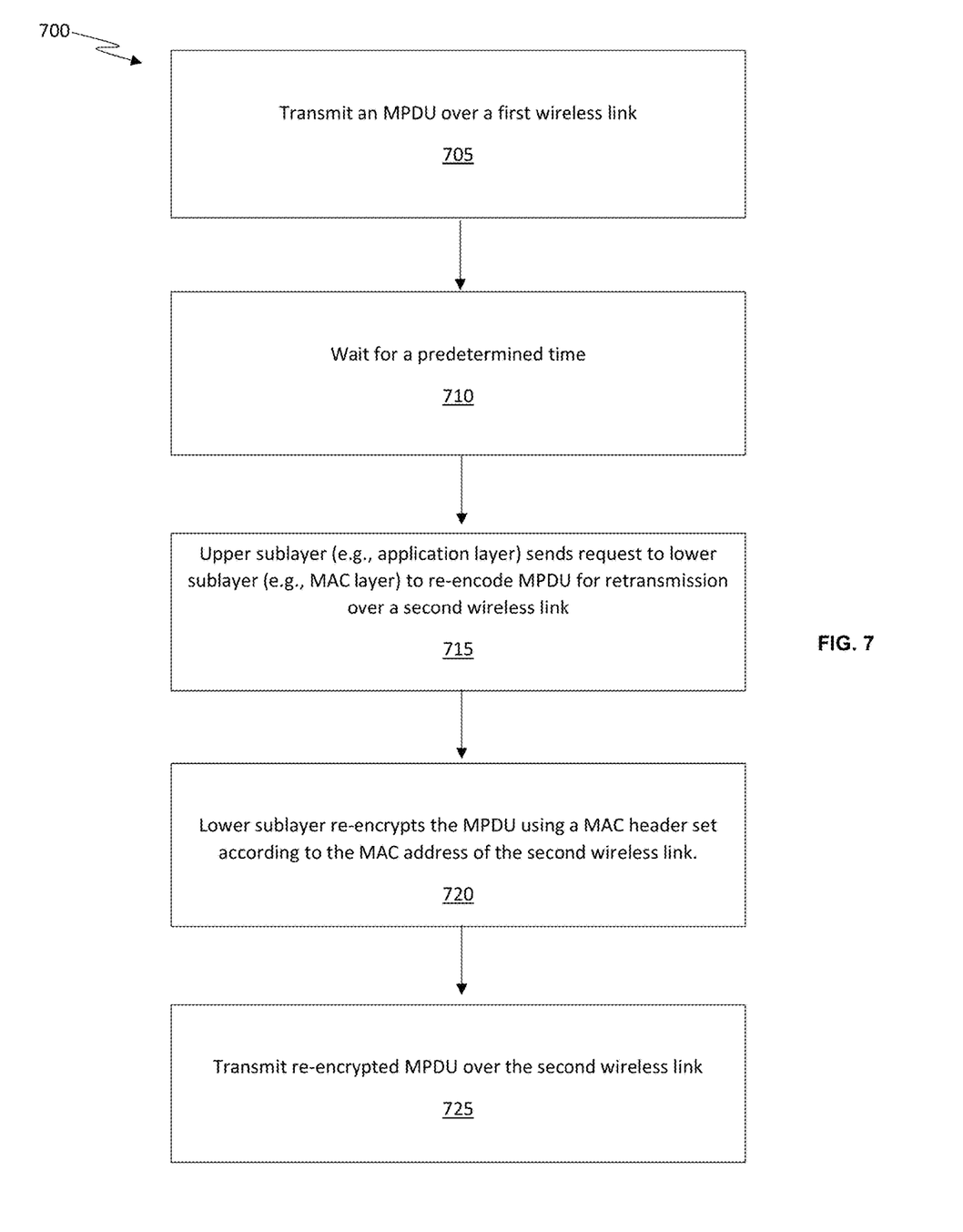
FIG. 7 is a flowchart of an exemplary sequence of computer implemented steps of a process for automatically retransmitting data in a multi-link operation using a lower sublayer (e.g., MAC layer) of a multi-link device to perform retransmission according to embodiments of the present invention.

With regard to FIG. 7, a flowchart of an exemplary sequence of computer implemented steps of a process 700 for automatically retransmitting data in a multi-link operation using a lower sublayer (e.g., MAC layer) of a multi-link device to perform retransmission is depicted according to embodiments of the present invention.

At step 705, an MPDU is transmitted over a first wireless link of the multi-link device. The MPDU can be stored in plaintext by the multi-link device. Step 705 can include encrypting the MPDU for transmission over the first wireless link.

At step 710, after a period of time, the MPDU is retransmitted. Step 710 may be repeated to retransmit the MPDU a number of times, for example, according to a retransmission value/limit.

At step 715, an upper sublayer (e.g., an application/ application layer) sends a request to a lower sublayer (e.g., MAC layer) to re-encrypt the MPDU including a MAC header set according to the MAC address of a second wireless link of the multi-link device.

At step 720, the lower sublayer re-encrypts the MPDU using a MAC header set according to the MAC address of the second wireless link. The MPDU can be re-encrypted using the CCMP encapsulation process depicted in FIG. 5. For example, the MPDU can be stored by the wireless device in plaintext, and a MAC header of the MPDU can be used to generate encrypted MPDU having a MAC header set according to the address of the second wireless link.

At step 725, the re-encrypted MPDU is transmitted using the second wireless link in a multi-link operation.

Figure 8:
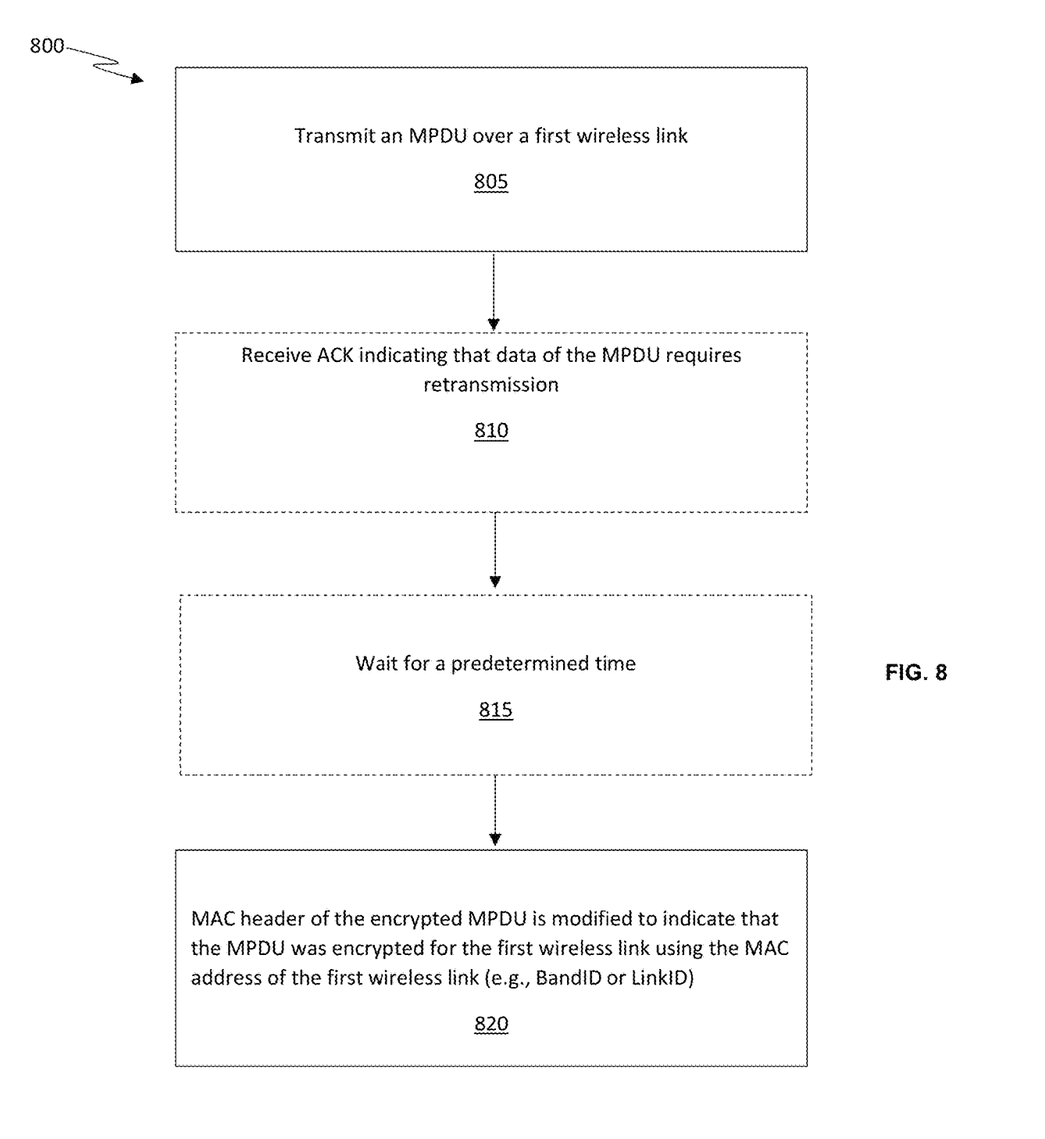
FIG. 8 is a flowchart of an exemplary sequence of computer implemented steps of a process for automatically retransmitting data in a multi-link operation using a previously encrypted MPDU according to embodiments of the present invention.

With regard to FIG. 8 is a flowchart of an exemplary sequence of computer implemented steps of a process 800 for automatically retransmitting data in a multi-link operation using a previously encrypted MPDU is depicted according to embodiments of the present invention.

At step 805 an MPDU is transmitted by a multi-link device over a first wireless link. Step 805 can include encrypting the MPDU for transmission over the first wireless link and storing the encrypted MPDU.

At step 810, an acknowledgment (ACK) is not received indicating that data of the MPDU requires retransmission (e.g., was not received).

At step 815, the multi-link device optionally waits for a predetermined time.

At step 820, the MAC header of the encrypted MPDU is modified to indicate that the MPDU was encrypted for the first wireless link including the MAC address of the first wireless link (e.g., BandID or LinkID) and transmitted on the second wireless link.

According to some embodiments, a peer device indicates its retransmission capabilities and/or preferred retransmission method, and the retransmission is performed according to the capabilities and/or preference indicated. Peer devices can negotiate the encryption method for retransmission at any time (e.g., while negotiating the encryption method). For example, a peer device may request or instruct the use of a different retransmission method when engaging in a latency sensitive communication or operation (e.g., real-time audio/video communication).

Exemplary Computer Controlled System

Figure 9:
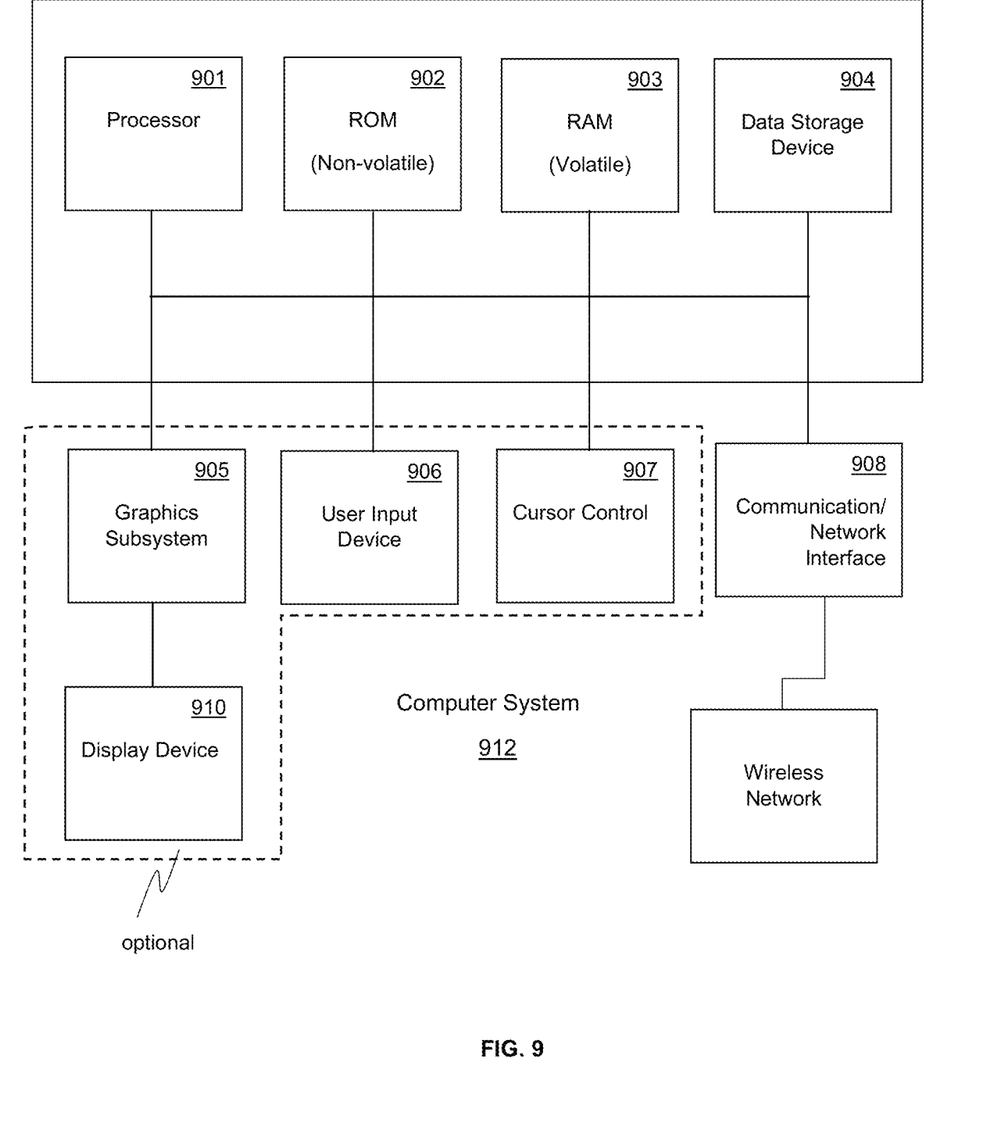
FIG. 9 is a block diagram depicting an exemplary computer system platform upon which embodiments of the present invention may be implemented.

Embodiments of the present invention are drawn to electronic systems configured to perform multi-link operations including retransmission using different wireless links. The following discussion describes one such exemplary electronic system or computer system that can be used as a platform for implementing embodiments of the present invention. The exemplary computer system 1012 can be a multi-link wireless device including a multi-link wireless access point or a multi-link wireless station, for example. The multi-link device can operate multiple transceivers simultaneously to perform multi-link operations including retransmission using different wireless links. For example, the multi-link device can transmit an encrypted MPDU using a first wireless link, and retransmit the MPDU using a second wireless link by setting a MAC header of the MPDU according to a MAC address of the second wireless link.

In the example of FIG. 9, the exemplary computer system or wireless device includes a central processing unit (such as a processor or a CPU) 901 for running software applications and optionally an operating system. Read-only memory 902 and random access memory 903 store applications and data for use by the CPU 901. Data storage device 904 provides non-volatile storage for applications and data and may include fixed disk drives, removable disk drives, flash memory devices, and CD-ROM, DVD-ROM or other optical storage devices. The optional user inputs 906 and 907 comprise devices that communicate inputs from one or more users to the computer system 912 (e.g., mice, joysticks, cameras, touch screens, and/or microphones).

A communication or network interface 908 includes a plurality of transceivers and allows the computer system 912 to communicate with other computer systems, networks, or devices via an electronic communications network, including wired and/or wireless communication and including an Intranet or the Internet (e.g., 802.11 wireless standard). According to embodiments of the present invention, the communication or network interface 908 can operate multiple transceivers simultaneously to perform multi-link operations including retransmission using different wireless links. The communication or network interface 908 can further include a cooperative management unit for coordinating the data sent and/or received by the transceivers. The communication or network interface 908 and can include a dual band interface that can operate in multiple bands simultaneously, such as 2.4 GHz, 5 GHz, and/or 6 GHz.

The optional display device 910 may be any device capable of displaying visual information in response to a signal from the computer system 912 and may include a flat panel touch sensitive display, for example, and may be remotely disposed. The components of the computer system 912, including the CPU 901, memory 902/903, data storage 904, user input devices 906, and optional graphics subsystem 905 may be coupled via one or more data buses.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of data retransmission over multiple wireless links using a multi-link device, the method comprising:
    transmitting an encrypted MPDU comprising an authenticated data portion over a first wireless link of the multi-link device;
    storing a plaintext MPDU as an encrypted MPDU;
    determining that the encrypted MPDU requires retransmission; and
    re-encrypting the plaintext MPDU using a MAC address of a second wireless link of the multi-link device for retransmission over the second wireless link.

2. The method of claim 1, further comprising setting a value in a MAC header of the plaintext MPDU using the MAC address of the second wireless link.

3. The method of claim 2, wherein the MAC header is comprised in the authenticated data portion of the encrypted MPDU.

4. The method of claim 1, wherein the MAC address of the first wireless link comprises at least one of a band identifier and a link identifier.

5. The method of claim 1, further comprising negotiating a link setup procedure with a peer wireless device.

6. The method of claim 5, wherein the negotiating a link setup procedure with a peer wireless device comprises negotiating a MAC address selection, wherein the MAC address selection comprises at least one of: a MAC-SAP address; a WM MAC address; and a virtual address.

7. The method of claim 1, further comprising determining a method of retransmission of an MPDU on the second wireless link.

8. The method of claim 1, wherein the determining that the encrypted MPDU requires retransmission comprises determining that a wireless link between peer devices is not available for MPDU transmission, and that a different wireless link between peer devices is available for MPDU transmission.

9. The method of claim 1, wherein the determining that the encrypted MPDU requires retransmission comprises determining that the multi-link device is transmitting delay sensitive data over the first wireless link and the second wireless link.

10. The method of claim 1, wherein the re-encrypting the plaintext MPDU comprises sending a request from an upper layer of the multi-link device to a lower layer of the multi-link device to re-encrypt the MPDU.

11. The method of claim 10, wherein the upper layer comprises an application layer.

12. The method of claim 10, wherein the lower layer comprises a MAC layer.

13. A method of data retransmission over multiple wireless links using a multi-link device, the method comprising:

transmitting an encrypted MPDU over a first wireless link of the multi-link device;

and retransmitting the encrypted MPDU over a second wireless link of the multi-link device with a modified MAC header indicating that the encrypted MPDU is encrypted using a MAC addresses of the first wireless link.

14. The method of claim 13, further comprising negotiating a link setup procedure with a peer wireless device.

15. The method of claim 13, further comprising determining that the multi-link device is transmitting delay sensitive data over the first wireless link and the second wireless link.

16. A multi-link device for performing data retransmission using multiple wireless links comprising:

a first transceiver configured to send and receive data over a first wireless link of the multi-link device;

a second transceiver configured to send and receive data over a second wireless link of the multi-link device;

a memory for storing MPDUs; and a processor operable to cause the transceivers to:

transmit an encrypted MPDU comprising an authenticated data portion over a first wireless link of the multi-link device;

storing a plaintext MPDU of the encrypted MPDU in the memory;

determining that the encrypted MPDU requires retransmission; and re-encrypting the plaintext MPDU using a MAC address of a second wireless link of the multi-link device for retransmission over the second wireless link.

17. The multi-link device of claim 16, wherein the processor is further operable to set a value in a MAC header of the MPDU using the MAC address of the second wireless link.

18. The multi-link device of claim 16, wherein the processor is further operable to retransmit a re-encrypted MPDU over the second wireless link using the second transceiver.

19. The multi-link device of claim 16, wherein the processor is further operable to negotiate a link setup procedure with a peer wireless device.

20. The multi-link device of claim 19, wherein the negotiate a link setup procedure with a peer wireless device comprises negotiating a MAC address selection, wherein the MAC address selection comprises at least one of: a MAC-SAP address; a WM MAC address; and a virtual address.

* * * * *